(12) United States Patent
Nakasaka

(10) Patent No.: US 9,303,615 B2
(45) Date of Patent: Apr. 5, 2016

(54) IGNITION TIMING CONTROL DEVICE FOR AN INTERNAL COMBUSTION ENGINE

(75) Inventor: Yukihiro Nakasaka, Suntou-gun (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/413,258

(22) PCT Filed: Jul. 9, 2012

(86) PCT No.: PCT/JP2012/067504
§ 371 (c)(1),
(2), (4) Date: Jan. 7, 2015

(87) PCT Pub. No.: WO2014/010022
PCT Pub. Date: Jan. 16, 2014

(65) Prior Publication Data
US 2015/0159618 A1      Jun. 11, 2015

(51) Int. Cl.
*F02P 5/152*   (2006.01)
*F02P 5/153*   (2006.01)
*F02D 35/02*   (2006.01)

(52) U.S. Cl.
CPC ............. *F02P 5/152* (2013.01); *F02D 35/028* (2013.01); *F02P 5/153* (2013.01); *Y02T 10/46* (2013.01)

(58) Field of Classification Search
CPC ..... F02D 35/027; F02D 35/028; F02D 41/00; F02P 5/145; F02P 5/152; F02P 5/153; Y02T 10/46
USPC ............. 123/406.11, 406.16, 406.19, 406.21, 123/406.25, 406.33, 406.36; 701/103–105, 701/110, 111
See application file for complete search history.

(56) References Cited

U.S. PATENT DOCUMENTS

| | | | | |
|---|---|---|---|---|
| 7,212,909 B2* | 5/2007 | Yoshino | ................ | F02D 35/028 123/406.37 |
| 7,472,687 B2* | 1/2009 | Zhu | ................ | F02P 17/12 123/406.14 |
| 7,712,450 B2* | 5/2010 | Sato | ................ | F02P 5/152 123/406.11 |
| 2002/0092488 A1* | 7/2002 | Aoyama | ............ | F01L 13/0021 123/90.16 |

(Continued)

FOREIGN PATENT DOCUMENTS

JP   2008-121597 A   5/2008
JP   2009-215989 A   9/2009

(Continued)

*Primary Examiner* — John Kwon
*Assistant Examiner* — Johnny H Hoang
(74) *Attorney, Agent, or Firm* — Kenyon & Kenyon LLP

(57) ABSTRACT

There is provided an ignition timing control device for an internal combustion engine capable of appropriately performing knock learning by performing knock learning adapted to an engine combustion phenomenon. The inventor has found the principle of a knock reduction effect due to ignition retard is that "if a combustion period moves toward the retard side, a cylinder volume during the combustion period increases, resulting in curbing of rise in the temperature and pressure of unburned gas". An ignition timing control device according to the present invention is capable of new knock learning based on the principle, which learns a "cylinder volume rate". The cylinder volume rate is a parameter determined from the amount of change in cylinder volume. Even when an operational status changes, learned ignition timing obtained from knock control means can be set to an appropriate value by reflecting the learned cylinder volume rate.

8 Claims, 5 Drawing Sheets

(56) References Cited

U.S. PATENT DOCUMENTS

2007/0199533 A1* 8/2007 Takahashi .............. F02D 17/04
 123/179.4
2012/0035835 A1* 2/2012 Glugla ................. F02D 35/027
 701/111

FOREIGN PATENT DOCUMENTS

| | | |
|---|---|---|
| JP | 2010-190134 A | 9/2010 |
| JP | 2011-256725 A | 12/2011 |

* cited by examiner

*Fig. 5*

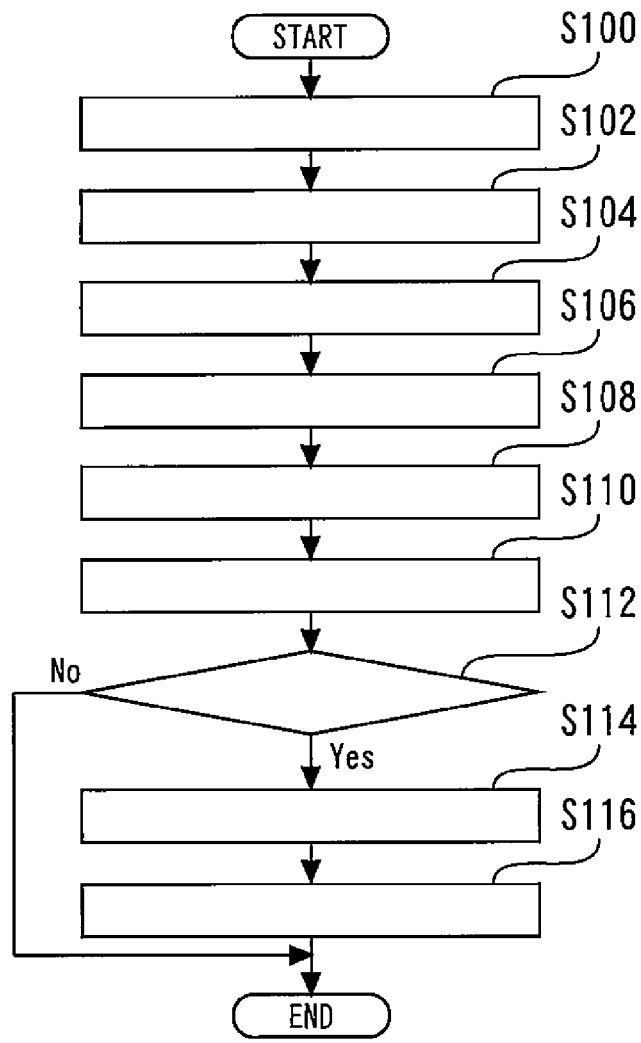

S100   DETECT VEHICLE STATUS AND ENGINE STATUS
S102   CONTROL INTAKE AMOUNT AND INJECTION AMOUNT
S104   CALCULATE CYLINDER VOLUME RATE CORRECTION VALUE
S106   CALCULATE KCS IGNITION TIMING LEARNING AMOUNT
S108   REFLECT IGNITION TIMING LEARNING VALUE CORRECTION AMOUNT
S110   KNOCK SENSOR F/B
S112   IS F/B CORRECTION AMOUNT LARGER
S114   CALCULATE TIMING WITH FRACTION BURNED OF 50%
S116   UPDATE KNOCK LEARNING VALUE

S100  DETECT VEHICLE STATUS AND ENGINE STATUS
S102  CONTROL INTAKE AMOUNT AND INJECTION AMOUNT
S204  CALCULATE IGNITION TIMING CORRECTION VALUE
S206  CALCULATE KCS IGNITION TIMING LEARNING AMOUNT
S208  REFLECT IGNITION TIMING LEARNING VALUE CORRECTION AMOUNT
S110  KNOCK SENSOR F/B
S212  IS F/B CORRECTION AMOUNT LARGER
S216  UPDATE KNOCK LEARNING VALUE

9,303,615 B2

IGNITION TIMING CONTROL DEVICE FOR AN INTERNAL COMBUSTION ENGINE

CROSS-REFERENCE TO RELATED APPLICATION

This is a national phase application based on the PCT International Patent Application No. PCT/JP2012/067504 filed Jul. 9, 2012, the entire contents of which are incorporated herein by reference.

TECHNICAL FIELD

The present invention relates to an ignition timing control device for an internal combustion engine.

BACKGROUND ART

As disclosed in, for example, Japanese Patent Laid-Open No. 2011-256725, an ignition timing control device for an internal combustion engine which is capable of ignition timing control for knock avoidance has been known. Such an ignition timing control device can detect the generation status of knocking with a knock sensor and execute knock control that performs feedback correction on ignition timing according to a result of the detection.

In the knock control, controlled variables (knock controlled variables) are set such that ignition timing is retarded when the frequency of occurrence of knocking is high and is advanced when the frequency of occurrence of knocking is low. Occurrence of knocking is reduced by setting a control target value for ignition timing on the basis of the knock controlled variables.

A steady-state deviation of a knock controlled variable from a reference value is learned as a knock learning value. In the technique of the above-described publication, a reference value concerned is set at 0, and a steady component of a knock controlled variable is diverted to use as a knock learning value.

CITATION LIST

Patent Literature

Patent Literature 1: Japanese Patent Laid-Open No. 2011-256725
Patent Literature 2: Japanese Patent Laid-Open No. 2008-121597
Patent Literature 3: Japanese Patent Laid-Open No. 2009-215989
Patent Literature 4: Japanese Patent Laid-Open No. 2010-190134

SUMMARY OF INVENTION

Technical Problem

In a knock learning technique according to the conventional art, however, a knock learning value is learned as an ignition timing correction amount corresponding to the number of engine revolutions and an engine load. The conventional learning technique is limited in appropriate knock learning.

That is, the conventional knock learning technique is basically to simply store a knock learning value in association with engine controlled variables, such as the number of engine revolutions and an engine load. Such a learning technique based on engine controlled variables stores a learning value according to the number of engine revolutions and an engine load and has difficulty in performing appropriate knock learning in response to environmental changes, such as a significant change in engine operating range, a difference between engine systems, and variation in or addition of an operational condition. For example, there are available a wide variety of engine systems including high supercharging, a variable mechanism, such as a variable compression ratio or variable valve mechanism, lean burn, and an EGR system. It is not preferable in terms of difficulty and complexity to perform knock learning with all operational conditions of the wide variety of engine systems in mind.

Despite a change in operating range, a difference between engine systems, or the like, occasions for knock learning are fundamentally the same in that a physical phenomenon called an engine combustion phenomenon is occurring. If knock learning can be performed on the basis of the relationship between the status of a physical phenomenon, such as an engine combustion phenomenon, and a knock reduction principle, preferred knock learning capable of dealing with a change in operating range and a difference between engine systems or the like is supposedly possible.

Under the circumstances, the present inventor has intensively studied the relationship between the status of a physical phenomenon, such as an engine combustion phenomenon, and a knock reduction principle and has made new findings about the principle of a knock reduction effect due to ignition retard. Through utilization of the findings made about the knock reduction principle, the present inventor has found a new knock learning technique capable of performing appropriate knock learning by performing knock learning adapted to an engine combustion phenomenon, unlike the conventional art.

The present invention has been made to solve the above-described problem and has as an object to provide an ignition timing control device for an internal combustion engine which is capable of appropriately performing knock learning by performing knock learning adapted to an engine combustion phenomenon.

Solution to Problem

According to the findings of the present inventor, the principle of a knock reduction effect due to ignition retard is that "if a combustion period moves toward the retard side, a cylinder volume during the combustion period increases, which results in curbing of rise in the temperature and pressure of unburned gas." An ignition timing control device according to the present invention is capable of new knock learning based on the principle.

That is, there is a correlation between ignition timing and a crank angle at which a fraction burned has a fixed value (also referred to as a "predetermined fraction burned crank angle" for convenience). For example, a crank angle at which a fraction burned is 50% (hereinafter also referred to as "CA50" for convenience) is correlated with ignition timing, and CA50 moves toward the retard side as the ignition timing is retarded. Given the relationship, ignition retard for knock avoidance moves the predetermined fraction burned crank angle toward the retard side. The closer to the retard side the predetermined fraction burned crank angle is located, the further below a top dead center a piston position for the predetermined fraction burned is located, and the larger a cylinder volume for the predetermined fraction burned is. That is, it can be said that one, determined to have a larger cylinder volume for a single fraction burned as a result of comparison between two given combustion strokes, has a larger cylinder volume at each point during a combustion period and has a larger cylinder volume over the entire combustion period. Such an increase in cylinder volume enhances a knock reduction effect.

An ignition timing control device for an internal combustion engine according to a first invention includes knock control means, first cylinder volume calculation means, second cylinder volume calculation means, cylinder volume rate learning means, third cylinder volume calculation means, and setting means for setting the learned ignition timing.

The knock control means performs ignition timing control such that knocking of the internal combustion engine is at or below a predetermined level.

The first cylinder volume calculation means calculates a cylinder volume at a predetermined fraction burned crank angle during a combustion stroke made with first base ignition timing when an engine operational status is in a first operating state. The predetermined fraction burned crank angle is preferably a crank angle at which a fraction burned is 50%.

The second cylinder volume calculation means calculates a cylinder volume at the predetermined fraction burned crank angle during a combustion stroke made with ignition timing obtained through corresponding ignition timing control by the knock control means when the engine operational status is in the first operating state.

The cylinder volume rate learning means calculates a cylinder volume rate and stores the calculated cylinder volume rate as a learning value. The cylinder volume rate is a value obtained by dividing, by the cylinder volume calculated by the first cylinder volume calculation means, a difference as a remainder after the cylinder volume calculated by the second cylinder volume calculation means is subtracted from the cylinder volume calculated by the first cylinder volume calculation means.

The third cylinder volume calculation means calculates a cylinder volume at the predetermined fraction burned crank angle during a combustion stroke made with second base ignition timing when the engine operational status is in a second operating state different from the first operating state.

The setting means sets learned ignition timing. The learned ignition timing is ignition timing as an initial value at the time of ignition timing control by the knock control means when the engine operational status is in the second operating state. The setting means sets the learned ignition timing such that a cylinder volume at the predetermined fraction burned crank angle during a combustion stroke made with the learned ignition timing increases with increase in the learning value.

According to a second invention, in the first invention, the setting means sets the learned ignition timing such that the cylinder volume at the predetermined fraction burned crank angle during the combustion stroke made with the learned ignition timing changes from the cylinder volume calculated by the third cylinder volume calculation means by an integrated value which is obtained by integrating the learning value into the cylinder volume calculated by the third cylinder volume calculation means.

According to a third invention, in the first invention, the predetermined fraction burned crank angle is one crank angle selected from a crank angle range where a fraction burned is not less than 50%.

According to a fourth invention, in the first invention, the setting means includes means for calculating the cylinder volume at the predetermined fraction burned crank angle according to a rule that the crank angle with a predetermined fraction burned is retarded in proportion to a retard amount with respect to the learned ignition timing.

According to a fifth invention, in any one of the first to fourth inventions, base value storage means is further included. The base value storage means stores information defining, for each of engine operational statuses, a base cylinder volume value which is a base value for a cylinder volume at a predetermined fraction burned crank angle. Additionally, the first cylinder volume calculation means includes means for reading out, as the cylinder volume at the predetermined fraction burned crank angle, a value corresponding to the first operating state among a plurality of base cylinder volume values stored in the base value storage means. In addition, the third cylinder volume calculation means includes means for reading out, as the cylinder volume at the predetermined fraction burned crank angle, a value corresponding to the second operating state among the plurality of base cylinder volume values stored in the base value storage means.

An ignition timing control device for an internal combustion engine according to a sixth invention includes knock control means, storage means, first crank angle acquisition means, first characteristic value calculation means, learning means, second crank angle acquisition means, second characteristic value calculation means, and setting means.

The knock control means performs ignition timing control such that knocking of the internal combustion engine is at or below a predetermined level.

The storage means stores a characteristic defining a relationship between the amount of change in crank angle per unit cylinder volume change rate and a crank angle.

The first crank angle acquisition means obtains, through sensing or estimation, a predetermined fraction burned crank angle during a combustion stroke when an engine operational status is in a first operating state.

The first characteristic value calculation means calculates, as a first characteristic value, a value of the amount of change in crank angle per unit cylinder volume change rate at the predetermined fraction burned crank angle obtained by the first crank angle acquisition means according to the characteristic.

The learning means stores, as a learning value, a ratio of a retard amount obtained through ignition timing control by the knock control means to the first characteristic value when the ignition timing control is performed in the first operating state.

The second crank angle acquisition means obtains, through sensing or estimation, the predetermined fraction burned crank angle during a combustion stroke when the engine operational status is in a second operating state different from the first operating state.

The second characteristic value calculation means calculates, as a second characteristic value, a value of the amount of change in crank angle per unit cylinder volume change rate at the predetermined fraction burned crank angle obtained by the second crank angle acquisition means according to the characteristic.

The setting means sets a learning retard amount which is an initial value for an ignition timing retard amount at the time of ignition timing control by the knock control means when the engine operational status is in the second operating state. The setting means sets the learning retard amount on the basis of a value obtained by multiplying the second characteristic value by the learning value.

Advantageous Effects of Invention

According to the first invention, new knock learning based on the knock reduction principle found by the present inventor allows appropriate knock learning adapted to an engine combustion phenomenon. Since the new knock learning performs knock learning based on an engine combustion phenomenon, ignition timing control can be performed using one common learning value for a plurality of different operating states.

According to the second invention, learned ignition timing can be set so as to obtain the same knock reduction effect each time in a different operating state.

According to the third invention, a crank angle with a fraction burned of 50% which is appropriate in terms of combustion balance or a crank angle in a second half of combustion which represents a knock occurrence factor well can be selected as a representative crank angle for combustion.

According to the fourth invention, it is possible to calculate a cylinder volume at the predetermined fraction burned crank angle without depending on a cylinder pressure sensor.

According to the fifth invention, it is possible to store an appropriate cylinder volume for each choice for an operational status utilizing the base value storage means and read out a cylinder volume at the predetermined fraction burned crank angle from the base value storage means as occasion arises.

According to the sixth invention, it is possible to perform, with a simple configuration, new knock learning based on the knock reduction principle found by the present inventor.

BRIEF DESCRIPTION OF DRAWINGS

FIG. 5 is a flowchart of a routine to be executed by an electronic control unit in the ignition timing control device according to the first embodiment of the present invention.

DESCRIPTION OF EMBODIMENTS

First Embodiment

Configuration of Device According to First Embodiment

Figure 1:
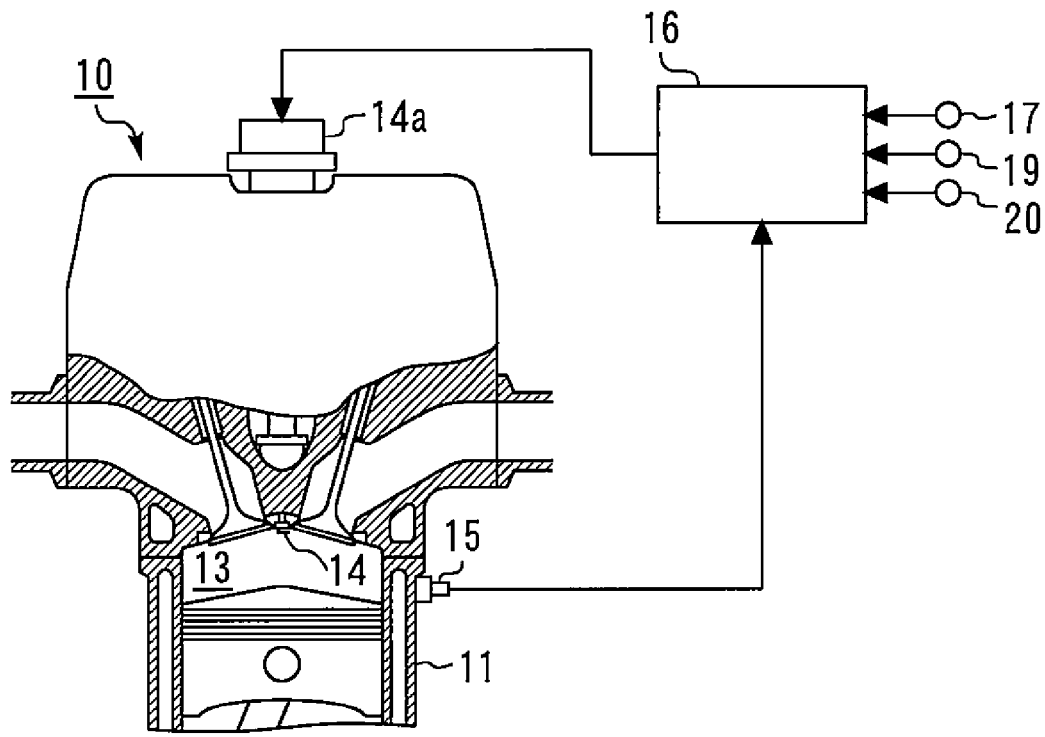
FIG. 1 is a chart showing the schematic configuration of an ignition timing control device according to a first embodiment of the present invention.

FIG. 1 is a view showing the schematic configuration of an ignition timing control device according to a first embodiment of the present invention. The ignition timing control device according to the present embodiment is applied to an internal combustion engine 10. The internal combustion engine 10 is a four-stroke spark ignition engine. Although not shown, the internal combustion engine 10 includes a plurality of cylinders and is an internal combustion engine to be vehicle-mounted.

A combustion chamber 13 of the internal combustion engine 10 is provided with a spark plug 14 which ignites and burns a gaseous mixture of air and fuel sucked into the combustion chamber 13. A cylinder block 11 of the internal combustion engine 10 is provided with a knock sensor 15. The knock sensor 15 is a sensor for detecting the generation status of knocking that occurs with burning of a gaseous mixture.

The internal combustion engine 10 includes an electronic control unit 16 related to operation of the internal combustion engine 10. The electronic control unit 16 is configured to include a CPU which executes various types of control, a memory, such as a ROM or a RAM, which stores information necessary for the control, an input port for receiving a signal from the outside, an output port for outputting a command signal to the outside, and the like.

Various types of sensors for detecting an engine operational status are connected to the input port of the electronic control unit 16. The various types of sensors include a crank angle sensor 17 for detecting a crank angle which is the rotation phase of a crankshaft (not shown), a throttle sensor 19 for detecting the aperture of a throttle valve (a throttle aperture TA), and an air flow meter 20 for detecting the amount of sucked air, in addition to the knock sensor 15. An engine speed NE is obtained from a detection signal from the crank angle sensor 17. The electronic control unit 16 calculates an engine load KL on the basis of the amount of sucked air, the number of engine revolutions, and the like.

Drive circuits for actuators necessary for engine control, such as an igniter 14a which generates a high-voltage current required to ignite a gaseous mixture by the spark plug 14, are connected to the output port of the electronic control unit 16. The electronic control unit 16 performs various types of arithmetic operations on the basis of detection signals from the sensors and executes driving and control of the actuators on the basis of results of the arithmetic operations, thereby performing engine control.

The electronic control unit 16 executes "knock control" that adjusts ignition timing according to the generation status of knocking detected by the knock sensor 15. In the knock control, control values (knock controlled variables) are set such that the ignition timing is retarded when the frequency of occurrence of knocking is high and is advanced when the frequency of occurrence of knocking is low. Occurrence of knocking is reduced by setting a control target value for the ignition timing on the basis of the knock controlled variables. Learning of a steady-state deviation of a knock controlled variable from a reference value for the knock controlled variable as a knock learning value is generally performed. In the present embodiment, the knock learning is performed in the manner described later.

In the present embodiment, the electronic control unit 16 stores a base cylinder volume map (to be described later) in the memory. In the base cylinder volume map, a base cylinder volume $V_{base}$ is defined for each of choices for the engine operational status. In the present embodiment, each choice of the engine operational status is determined by the engine revolution speed NE and the engine load KL. The electronic control unit 16 can execute a process of reading out one base cylinder volume $V_{base}$ from the base cylinder volume map, using the engine revolution speed NE and the engine load KL as input variables.

Action of Device According to First Embodiment

Principle of Knock Reduction Effect Due to Ignition Retard

According to the findings of the present inventor, the principle of a knock reduction effect due to ignition retard is that "if ignition timing is retarded to move a combustion period toward the retard side, a cylinder volume during the combustion period increases, which results in curbing of rise in the temperature and pressure of unburned gas." The ignition timing control device according to the present embodiment is capable of knock learning based on the principle.

More specifically, there is a definite relationship among ignition timing, a fraction burned, a crank angle, and a cylinder volume in relation to knock reduction.

A fraction burned (hereinafter also referred to as a "MFB") is a value defined as an indicator of the progress status of combustion. Specifically, a fraction burned ranges from 0 to 1 (or ranges from 0% to 100%). A fraction burned of 0 (0%) represents a combustion start point while a fraction burned of 1 (100%) represents a combustion end point.

$$MFB = (P_\theta V_\theta^\kappa - P_{\theta 0} V_{\theta 0}^\kappa)/(P_{\theta f} V_{\theta f}^\kappa - P_{\theta 0} V_{\theta 0}^\kappa) \quad (1)$$

Note that $P_{\theta 0}$ and $V_{\theta 0}$ in Expression (1) above represent a cylinder pressure P and a cylinder volume V, respectively, when a crank angle $\theta$ is at predetermined combustion start timing $\theta_0$ and that $P_{\theta f}$ and $V_{\theta f}$ represent the cylinder pressure P and the cylinder volume V, respectively, when the crank angle $\theta$ is at predetermined combustion end timing $\theta_f$. Also, note that $P_\theta$ and $V_\theta$ represent the cylinder pressure P and the cylinder volume V, respectively, when the crank angle $\theta$ has an arbitrary value; and $\kappa$, a specific heat ratio. A technique related to a fraction burned is known, and a further description thereof will be omitted.

There is a correlation between ignition timing and a crank angle at which a fraction burned has a fixed value. Hereinafter, a "crank angle at which a fraction burned has a fixed value" will also be referred to as a "predetermined fraction burned crank angle" for convenience. For example, a crank angle at which a fraction burned is 50% will also be referred to as "CA50" for convenience and described below. CA50 is correlated with ignition timing and moves toward the retard side as the ignition timing is retarded. Given the relationship, ignition retard for knock avoidance moves CA50 toward the retard side. The closer to the retard side CA50 is located, the further below a top dead center a piston position for CA50 is located, and the larger a "cylinder volume for CA50" is. The "cylinder volume for CA50" is a cylinder volume determined from a crank angle position when a fraction burned reaches 50%.

It can be said on the basis of the relationship that one, determined to have a larger cylinder volume for a single fraction burned as a result of comparison between two given combustion strokes, has a larger cylinder volume at each point during a combustion period and has a larger cylinder volume over the entire combustion period. Such an increase in cylinder volume during a combustion period curbs rise in the temperature and pressure of unburned gas and enhances a knock reduction effect. The principle will be described with reference to FIG. 2.

Figure 2:
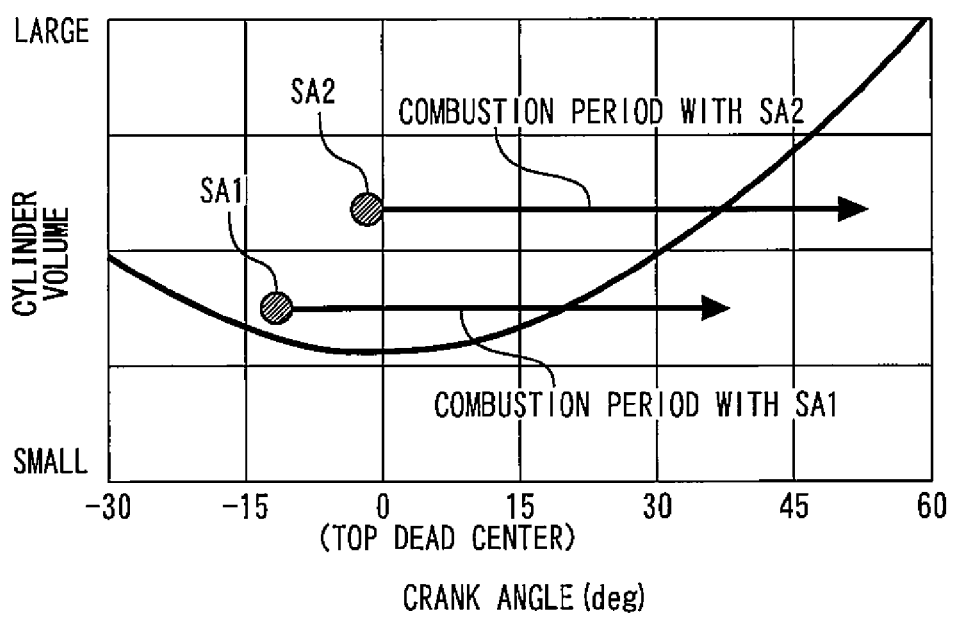
FIG. 2 is a schematic chart for explaining the details of knock learning in the ignition timing control device according to the first embodiment of the present invention.

FIG. 2 is a schematic chart for explaining the details of knock learning in the ignition timing control device according to the first embodiment of the present invention. The graph shown in FIG. 2 shows, for each crank angle, a value of a cylinder volume determined by the piston position for the crank angle. The cylinder volume has a minimum value for a crank angle of 0° corresponding to a piston top dead center and increases away from the top dead center.

Two different ignition timing SA1 and SA2 are illustrated in FIG. 2. A combustion period when combustion is carried out with the ignition timing SA1 and a combustion period when combustion is carried out with the ignition timing SA2 are further schematically illustrated in FIG. 2.

As can be seen from FIG. 2, the more ignition timing is retarded, the closer to the retard side a combustion period is located. Comparison of the cylinder volume graph in FIG. 2 with an arrow of the combustion period with SA1 shows that the combustion period with SA1 is a fixed period after the cylinder volume decreases after ignition, reaches a minimum value at the top dead center, and then transitions to an upward trend. In contrast, comparison of the cylinder volume graph in FIG. 2 with an arrow of the combustion period with SA2 shows that the combustion period with SA2 is a fixed period after the cylinder volume transitions to an upward trend from the top dead center. The combustion period with SA2 is located in a crank angle range with a larger cylinder volume than SA1 over the entire crank angle range. Comparison of the two combustion periods shows that the cylinder volume at each point during a combustion period is larger in the combustion period with SA2 than in the combustion period with SA1. That is, it can be said that the combustion period with SA2 has an increased cylinder volume during a combustion period. Retarding ignition timing to retard a combustion period overall allows the cylinder volume during the combustion period to be made larger. Since a cylinder volume during a combustion period is increased for SA2 as compared with SA1, rise in the temperature and pressure of unburned gas is more curbed for SA2, and a higher knock reduction effect is obtained.

The ignition timing control device according to the present embodiment can perform knock learning based on the above-described knock reduction principle. In the present embodiment, a "cylinder volume rate" (to be described later) is learned. The cylinder volume rate is a parameter determined from the amount of change in cylinder volume. Learned ignition timing obtained from knock control means can be set to an appropriate value by reflecting a learned cylinder volume rate even with a change in operational status.

(Detailed Description of Action of Ignition Timing Control Device)

As a precondition for action of the ignition timing control device according to the present embodiment, the electronic control unit 16 first stores a base cylinder volume map. In the base cylinder volume map, a base cylinder volume $V_{base}$ is defined for each operating state defined by the engine revolution speed and an engine load. In the present embodiment, the "base cylinder volume $V_{base}$" is a value of the cylinder volume for CA50 during a combustion stroke made with base ignition timing $SA_{base}$. The base ignition timing is ignition timing set as an ignition timing base value of the internal combustion engine 10 and is stored as an ignition timing map in the electronic control unit 16.

More specifically, in the base cylinder volume map, a first base cylinder volume $V_{base1}$ when combustion is carried out with base ignition timing $SA_{base1}$ for a first operating state is stored corresponding to the first operating state with a first engine revolution speed $NE_1$ and a first engine load $KL_1$. A second base cylinder volume $V_{base2}$ when combustion is carried out with base ignition timing $SA_{base2}$ for a second operational condition is stored corresponding to a second operating state with a second engine revolution speed $NE_2$ and a second engine load $KL_2$. Similarly, a base cylinder volume ($V_{base1}$, $V_{base2}$ ..., $V_{basen}$) when combustion is carried out with base ignition timing ($SA_{base1}$, $SA_{base2}$, ... $SA_{basen}$) for a corresponding operating state is stored for each of n (n is an integer) operating states (the first operating state, the second operating state, ..., an n-th operating state). The base cylinder volume map is created in advance and is stored in a memory area of the electronic control unit 16. The utilization of the base cylinder volume map allows obtainment of one base cylinder volume $V_{base}$ corresponding to values of the given engine revolution speed NE and a given engine load KL when the engine revolution speed NE and the engine load KL are given.

The ignition timing control device according to the present embodiment performs the following main processes: a "learning process"; and a "learning value reflection process." The processes will be described below with reference to FIG. 3.

Figure 3:
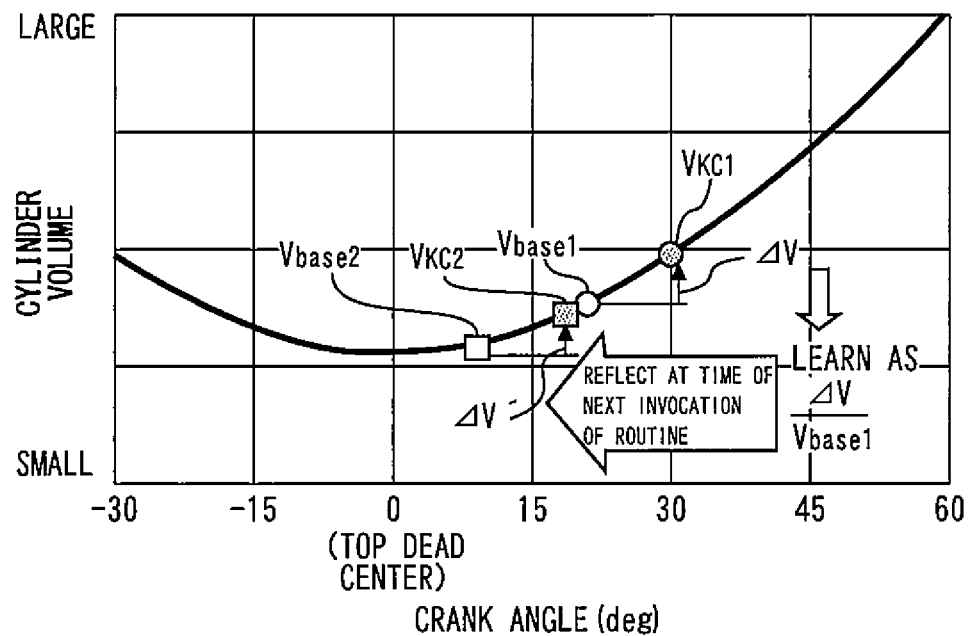
FIG. 3 is a schematic chart for explaining the details of the knock learning in the ignition timing control device according to the first embodiment of the present invention.

FIG. 3 is a schematic chart for explaining the details of the knock learning in the ignition timing control device according to the first embodiment of the present invention. The graph shown in FIG. 3 shows a value of the cylinder volume for each crank angle, like FIG. 2. The cylinder volume has a minimum value for a crank angle of 0° corresponding to the piston top dead center. Four points are plotted on the cylinder volume graph in FIG. 3. The four points are denoted by $V_{base1}$, $V_{base2}$, $V_{KC1}$, and $V_{KC2}$.

Reference characters $V_{base1}$ and $V_{base2}$ denote base cylinder volumes, respectively, in different operating states.

Reference characters $V_{KC1}$ and $V_{KC2}$ denote "actual cylinder volumes," respectively. An actual cylinder volume is the cylinder volume for CA50 during a combustion stroke when combustion is carried out with ignition timing obtained by retarding base ignition timing by ignition timing control. The ignition timing refers to ignition timing when knock avoidance is achieved if ignition timing retard is performed for the knock avoidance. Reference characters $V_{KC1}$ and $V_{KC2}$ denote actual cylinder volumes in operating states different from each other.

(Learning Process)

The learning process includes a cylinder volume detection process, a knock control process, a first cylinder volume calculation process, a second cylinder volume calculation process, and a cylinder volume rate learning process.

The electronic control unit 16 can execute the cylinder volume detection process. The cylinder volume detection process obtains, through estimation, the cylinder volume for CA50 during each combustion stroke of the combustion engine. In the present embodiment, the cylinder volume for CA50 is obtained through estimation by executing calculation processing in the cylinder volume detection process.

The calculation processing in the cylinder volume detection process adopts the assumption that retardation of ignition timing is accompanied by retardation of CA50 and that an ignition timing retard amount and a CA50 retard amount coincide with each other. The assumption is based on the assumption that the length of a combustion period from when a fraction burned is 0% to when the fraction burned is 50% is the same regardless of ignition timing. According to the assumption, a value of the cylinder volume for CA50 when combustion is carried out with base ignition timing, i.e., a base cylinder volume is first obtained in advance. When a retard amount with respect to the base ignition timing is determined, a CA50 retard amount is determined according to the retard amount. When the CA50 retard amount is determined, a "value of the cylinder volume for CA50 after the retardation" can be calculated by increasing the base cylinder volume by an amount corresponding to the retard amount according to the relationship between a piston position determined from a crank angle and a cylinder volume. In the present embodiment as well, a cylinder volume detection process program for calculating the cylinder volume for CA50 reflecting an ignition timing retard amount is created in advance on the basis of the assumption, and the electronic control unit 16 executes the process.

The electronic control unit 16 executes the knock control process. The knock control process is a process of performing ignition timing control such that knocking of the internal combustion engine 10 is at or below a predetermined level. Specifically, the knock control process obtains corrected ignition timing that is obtained by correcting (retarding or advancing) the base ignition timing such that knocking detected by the knock sensor 15 is at or below an acceptable level. With this process, knocking is avoided.

The electronic control unit 16 executes the first cylinder volume calculation process. In the present embodiment, the first cylinder volume calculation process calculates the first base cylinder volume $V_{base1}$ shown in FIG. 3.

The first base cylinder volume $V_{base1}$ is the cylinder volume for CA50 during a combustion stroke made with the first base ignition timing $SA_{base1}$ when the engine operational status is in the first operating state (with the first engine revolution speed $NE_1$ and the first engine load $KL_1$).

In the present embodiment, the electronic control unit 16 reads out a value corresponding to the first engine revolution speed $NE_1$ and the first engine load $KL_1$ as the base cylinder volume $V_{base1}$ among a plurality of base cylinder volume values stored in the base cylinder volume map.

The electronic control unit 16 executes the second cylinder volume calculation process. In the present embodiment, the second cylinder volume calculation process calculates the actual cylinder volume $V_{KC1}$ shown in FIG. 3.

The actual cylinder volume $V_{KC1}$ is the cylinder volume for CA50 during a combustion stroke made with ignition timing after ignition timing control through knock control after the control is performed when the engine operational status is in the first operating state.

That is, ignition timing is corrected (retarded or advanced) on the basis of a detection value from the knock sensor 15 by the knock control process such that knocking is at or below the predetermined level. With this correction, a given correction amount $\Delta SA$ is added to the base ignition timing $SA_{base}$. Combustion is carried out with the corrected ignition timing, thereby determining CA50 during a combustion stroke. In terms of engine structure, a piston position is determined from a crank angle, which results in determination of a cylinder volume. Thus, when a value of CA50 is determined, one value of the cylinder volume is determined according to the value.

In the present embodiment, a cylinder volume is calculated from the above-described series of relationships among ignition timing, a fraction burned, a crank angle, and a cylinder volume. For the calculation, a function uniquely defining the relationship between ignition timing and a cylinder volume is stored in advance in the form of a mathematical expression or a map in the electronic control unit 16. The electronic control unit 16 executes a process of calculating $V_{KC1}$ from an ignition timing correction amount (a retard amount) according to the mathematical expression or the map representing the function.

The electronic control unit 16 executes the cylinder volume rate learning process. The cylinder volume rate learning process calculates a cylinder volume rate and storing the cylinder volume rate as a learning value. A cylinder volume rate is a value obtained by dividing, by a "cylinder volume calculated by the first cylinder volume calculation process," a difference that is the remainder after a "cylinder volume calculated by the second cylinder volume calculation process" is subtracted from the "cylinder volume calculated by the first cylinder volume calculation process." In the present embodiment, a cylinder volume rate to be stored as a learning value is represented by the following expressions:

$$\text{"Cylinder Volume Rate"} = \Delta V / V_{base1} \quad (2)$$

$$\Delta V = V_{base1} - V_{KC1} \quad (3)$$

In the present embodiment, the electronic control unit 16 executes a learning value storage process of storing a value of $\Delta V/V_{base1}$ as a knock learning value in a predetermined memory area.

(Learning Value Reflection Process)

The learning value reflection process is a step for utilizing a learning value acquired by the learning process at the time of later knock control in a different operating state (called the "second operating state" in the present embodiment). The learning value reflection process includes a third cylinder volume calculation process and a learned ignition timing setting process.

The electronic control unit 16 first executes the third cylinder volume calculation process. In the present embodiment, the third cylinder volume calculation process calculates the second base cylinder volume $V_{base2}$ shown in FIG. 3. The second base cylinder volume $V_{base2}$ is the cylinder volume for CA50 during a combustion stroke made with the second base ignition timing $SA_{base2}$ when the engine operational status is in the second operating state (with the second engine revolution speed $NE_2$ and the second engine load $KL_2$) different from the first operating state.

In the present embodiment, the electronic control unit 16 reads out a base cylinder volume value which is determined from the second engine revolution speed $NE_2$ and the second engine load $KL_2$ from the base cylinder volume map and sets the value as the second base cylinder volume $V_{base2}$.

The electronic control unit 16 executes a setting process of setting "learned ignition timing." The "learned ignition timing" is ignition timing as an initial value at the time of ignition timing control through the knock control process when the engine operational status is in the second operating state. That is, in the knock control process, ignition timing control is started using the learned ignition timing as an initial value, and the initial value is further corrected (generally retarded). Specifically, the setting process sets an initial value for the correction amount ($\Delta SA$) to be added to the base ignition timing $SA_{base}$, and the correction amount is used to calculate the learned ignition timing.

The setting process sets the learned ignition timing such that the actual cylinder volume $V_{KC2}$ increases with increase in the learning value. The actual cylinder volume $V_{KC2}$ is an actual cylinder volume during a combustion stroke with the learned ignition timing and is shown in FIG. 3. In the present embodiment, the setting process sets "learned ignition timing when the actual cylinder volume $V_{KC2}$ is achieved." That is, as shown in FIG. 3, reference character $V_{KC2}$ denotes a cylinder volume which is obtained by increasing the second base cylinder volume $V_{base2}$ by a given increase $\Delta V'$. In the present embodiment, the cylinder volume increased amount $\Delta V'$ is calculated using the learning value as follows:

$$\Delta V' = V_{base2} \times (\Delta V / V_{base1}) \quad (4)$$

An ignition timing retard amount with respect to the base ignition timing is calculated such that the cylinder volume increases from $V_{base2}$ by $\Delta V'$. That is, the ignition timing retard amount with respect to the base ignition timing is calculated so as to obtain the learned ignition timing when the actual cylinder volume $V_{KC2}$ is achieved.

As described in the cylinder volume detection process, the present embodiment adopts the assumption that an ignition timing retard amount and a CA50 retard amount coincide with each other. On the basis of the assumption, the present embodiment assumes that an ignition timing retard amount and a CA50 retard amount coincide with each other, and the ignition timing retard amount is calculated such that the actual cylinder volume $V_{KC2}$ during this combustion stroke is a "cylinder volume which is obtained by adding $\Delta V'$ to $V_{base2}$."

After that, a learning result from the series of processes is utilized for ignition timing control. That is, in knock control, ignition timing control is started after an initial value for ignition timing is set as the learned ignition timing.

After that, the learning process and the learning value reflection process are repeated again. That is, a series of processes, such as making a correction to base ignition timing such that knocking detected by the knock sensor 15 is at or below an acceptable level, and learning a cylinder volume rate, are executed. In this case, a portion related to the first operating state of the above description is replaced with an "operating state during an earlier combustion stroke," and a portion related to the second operating state is replaced with an "operating state during a later combustion stroke." On that basis, similar processes may be executed every combustion stroke during operation of the internal combustion engine 10.

During operation of the internal combustion engine 10, the above-described series of processes are repeatedly performed while the operational status changes or a disturbance (a change in intake temperature, intake pipe pressure, octane number, or any other environmental condition) occurs.

According to the present embodiment, a plurality of operating states can be coped with by having one cylinder volume rate learning value. That is, a learning value is updated while the learning process and the learning value reflection process are repeated with passage of operating time of the internal combustion engine 10. A retard amount with respect to base ignition timing can be calculated by Expression (4) above using the updated latest learning value such that learned ignition timing when an appropriate actual cylinder volume is achieved is obtained. Learning values can thus be unified. As described above, the knock learning technique of the ignition timing control device according to the present embodiment can appropriately set a knock learning value by a consistent learning method utilizing one cylinder volume rate learning value even in each of a plurality of different operating states.

Figure 4:
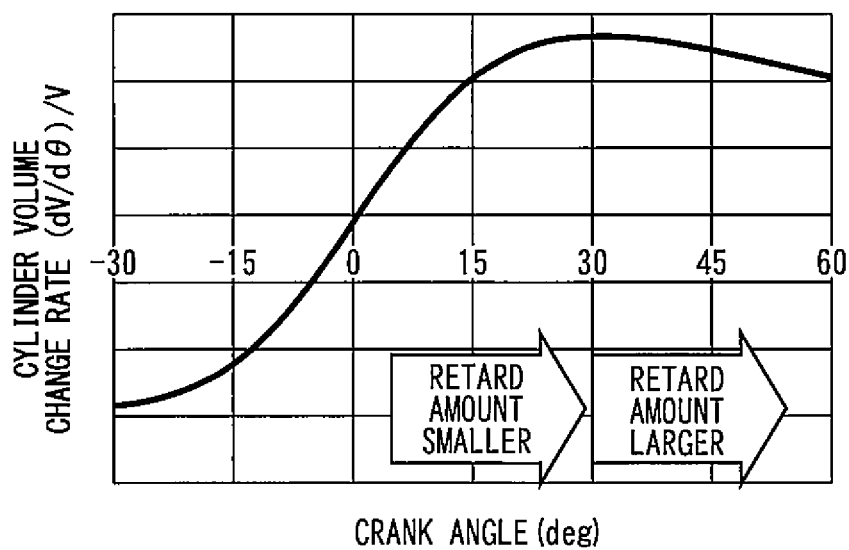
FIG. 4 is a schematic chart for explaining a working effect of the knock learning in the ignition timing control device according to the first embodiment of the present invention.

FIG. 4 is a schematic chart for explaining a working effect of the knock learning in the ignition timing control device according to the first embodiment of the present invention.

The ordinate in FIG. 4 represents a "cylinder volume change rate" which is a value of $(dV/d\theta)/V$. Reference character V denotes the cylinder volume, and $dV/d\theta$ represents a change in cylinder volume per one degree of the crank angle.

A knock reduction effect increases with increase in the cylinder volume change rate per one degree of the crank angle. Due to a crank diameter and a connecting rod length which are geometrical dimensions of the engine, a predetermined crank angle marks transition of a knock reduction effect per one degree of the crank angle from an upward trend to a downward trend. The transition is represented in FIG. 4. It can be seen from FIG. 4 that a given crank angle (a crank angle of 30° in FIG. 4) marks transition of the cylinder volume change rate from an upward trend to a downward trend. That is, under the same conditions (if the statuses of disturbance are the same), a retard amount is smaller on the advance side of the given crank angle and is larger on the retard side of the given crank angle. In the knock learning according to the first embodiment, a cylinder volume rate is held as a learning value, and ignition timing at the time of knock avoidance is determined by using the learning value. The knock learning thus has the advantage in that ignition timing control with the above-described trend in cylinder volume change rate is achieved.

There is a relationship between a cylinder volume change rate and a rate of change in the temperature and pressure of unburned gas, and if cylinder volume change rates are the same, corresponding rates of change in the temperature and pressure of unburned gas are also the same. On the basis of the relationship, the same knock reduction effect can be obtained each time even in a different operating state by making constant a cylinder volume change rate associated with ignition timing retard. In this respect, in the first embodiment, multiplication by the same learning value (the same cylinder volume rate) is performed each time by Expression (4) above unless the learning value is not updated. An ignition time retard amount is determined such that an actual cylinder volume determined from a calculation result is achieved. This allows equalization of knock reduction effects on respective occasions.

Specific Control Process of Device According to First Embodiment

FIG. 5 is a flowchart of a routine to be executed by the electronic control unit 16 in the ignition timing control device according to the first embodiment of the present invention. The electronic control unit 16 repeatedly executes the routine for each combustion stroke (for each combustion cycle) during operation of the internal combustion engine 10. A case will be described below where the routine in FIG. 5 is executed again after the routine in FIG. 5 is executed once, and a learning value is obtained once.

In the routine in FIG. 5, the electronic control unit 16 first executes a process of detecting a vehicle status and an engine status (step S100). In this step, the three detection processes below are performed.

In the present embodiment, the internal combustion engine 10 is assumed to be mounted on a vehicle. A first detection process is a process of detecting the speed of the vehicle. The speed detection is implemented by the electronic control unit 16 through receiving an output signal from a speedometer of the vehicle.

A second detection process is a process of detecting a driver request to the vehicle. Specifically, the driver request detection includes detection of an accelerator position and detection of a shift position. The detection of the positions is performed by the electronic control unit 16 through receiving signals from an accelerator position sensor and a shift position detection circuit (not shown).

A third detection process is a process of detecting the engine status of the internal combustion engine 10. The engine status includes an engine coolant temperature, the engine revolution speed, the amount of sucked air, and a compression ratio. The detection of the parameters is performed by the electronic control unit 16 through obtaining outputs from various types of sensors mounted on the internal combustion engine, such as an engine water temperature sensor, a crank position sensor, and the air flow meter.

The electronic control unit 16 performs fuel injection amount control on the basis of the detected amount of sucked air (step S102).

In this step, more specifically, engine control other than ignition timing control is performed utilizing a result of the detection in step S100. The engine control performed here may utilize various types of known engine control techniques, and a detailed description thereof will be omitted.

The electronic control unit 16 executes a process of calculating a cylinder volume rate correction value (step S104). This step is a step of calculating, as a cylinder volume rate $\Delta V/V$, an ignition timing correction value which is required when an environment, including an intake temperature, an outside temperature, and a boost pressure, changes. Note that a method for calculating a cylinder volume rate correction value described here is different from the calculation described in the "learning process" according to the first embodiment.

As a precondition for the step, the electronic control unit 16 stores a correction value calculation program for calculating a cylinder volume rate correction value $(\Delta V/V)_{dst}$ corresponding to a disturbance related to an intake temperature, an outside temperature, or any other parameter. The cylinder volume rate correction value $(\Delta V/V)_{dst}$ is an index value indicating, in case of a change in an environment, such as an intake temperature, an outside temperature, or a boost pressure, how much ignition timing is to be retarded for the amount of change (e.g., a change in temperature).

In the present embodiment, the relationship between the cylinder volume rate correction value $(\Delta V/V)_{dst}$ and the "amount of disturbance change" is created in advance in the form of a correction value mathematical expression or a correction value map, and a correction value calculation program utilizing the relationship is stored in advance in the electronic control unit 16. By inputting the amount of disturbance change to the correction value calculation program, the cylinder volume rate correction value $(\Delta V/V)_{dst}$ is calculated. Note that specific examples of the amount of disturbance change include the amount of change in intake temperature based on an output from an intake temperature sensor (not shown), the amount of change in outside temperature based on an output from an outside temperature sensor (not shown), and the amount of change in boost pressure based on an output from an intake pressure sensor (not shown). A plurality of correction value mathematical expressions or correction value maps described above are created in advance for respective types of disturbances or respective operating states.

The cylinder volume rate correction value $(\Delta V/V)_{dst}$ calculated in step S104 is used together with a cylinder volume rate learning value according to the present embodiment in a subsequent step. In this manner, a cylinder volume rate to be finally achieved is calculated.

The electronic control unit 16 executes a process of calculating a KCS ignition timing learning amount (step S106). The electronic control unit 16 then executes a process of reflecting a correction amount as an ignition timing learning value (step S108). In these steps, the electronic control unit 16 performs the "learned ignition timing setting process" in the "learning value reflection process" described earlier.

In step S106, the electronic control unit 16 first executes a process of reading out a knock learning value learned in the above described "learning process." For convenience of illustration, the present embodiment assumes that the last knock learning has been performed in the first operating state and that a value of $\Delta V/V_{base1}$ is stored as the knock learning value.

In the present embodiment, the cylinder volume rate correction value $(\Delta V/V)_{dst}$ and the knock learning value $\Delta V/V_{base1}$ are combined to calculate an integrated cylinder volume rate $(\Delta V/V)_{Total}$. The "combination" refers to calculation to reflect a plurality of correction values in ignition timing control.

In the present embodiment, one numerical value into which a correction value and a learning value are integrated is obtained by multiplying a value of $(V+\Delta V)/V$. A description will be given with specific numerical values. If $(\Delta V/V)_{dst}$ calculated in step S104 is 0.1, substitution of 0.1 in $(V+\Delta V)/V$ yields a value of $(1+0.1)=1.1$. If the knock learning value $\Delta V/V_{base1}$ is 0.2, substitution of 0.2 in $(V+\Delta V)/V$ yields a value of $(1+0.2)=1.2$. Multiplication of 1.1 and 1.2 yields an integrated value of 1.32. In the present embodiment, the value of 1.32 is treated as one value into which a plurality of correction values and learning values (i.e., the cylinder volume rate correction value $(\Delta V/V)_{dst}$ and the knock learning value $\Delta V/V_{base1}$) are integrated (combined).

The relationship among $(\Delta V/V)_{Total}$, $\Delta V/V_{base1}$, and $(\Delta V/V)_{dst}$ is represented as follows:

$$1+(\Delta V/V)_{Total}=(1+\Delta V/V_{base1})\times(1+(\Delta V/V)_{dst}) \quad (5)$$

Mathematical Expression (5) leads to the fact that if $(\Delta V/V)_{dst}$ is 0.1, and $\Delta V/V_{base1}$ is 0.2, $(\Delta V/V)^{Total}$ is 0.32.

The reason why a cylinder volume rate correction value and a value of a knock learning value are not simply added but are multiplied in the present embodiment is that the values represent respective change rates and cause an error when the values are simply added.

The electronic control unit 16 calculates a cylinder volume increased amount $\Delta V_2'$ using the integrated cylinder volume rate $(\Delta V/V)_{Total}$.

$$\Delta V_2'=V_{base2}\times(\Delta V/V)_{Total} \quad (6)$$

The calculation in Mathematical Expression (6) is similar to that in Mathematical Expression (4) associated with the "learning value reflection process." Note that the present embodiment assumes that the current operational status is in the second operating state and that the cylinder volume increased amount $\Delta V_2'$ with respect to the base cylinder volume $V_{base2}$ is calculated, for convenience of illustration.

In step S108, the electronic control unit 16 calculates an ignition timing retard amount with respect to the second base ignition timing $SA_{base2}$. The ignition timing retard amount is a retard amount calculated with respect to the base ignition timing $SA_{base2}$ such that the cylinder volume is increased from the base cylinder volume $V_{base2}$ this time by $\Delta V_2'$. In other words, the ignition timing retard amount is a retard amount which is calculated with respect to the base ignition timing $SA_{base2}$ so as to obtain learned ignition timing when the actual cylinder volume $V_{KC2}$ is achieved.

The electronic control unit 16 executes an ignition timing feedback control process on the basis of an output from the knock sensor 15 (step S110). Note that a combustion stroke has been started in the internal combustion engine 10 at the beginning of this step and that the internal combustion engine 10 is in a situation where knocking can be detected by the knock sensor 15. In this step, ignition timing control is performed, through execution of knock control by the electronic control unit 16, such that knocking is at or below an allowable level. An initial value for the knock control is ignition timing reflected in step S108 above (i.e. learned ignition timing).

The electronic control unit 16 executes a process of judging whether a feedback correction amount is larger than a predetermined value (step S112). A change in an intake temperature, an intake pipe pressure, cylinder deposit accumulation, an octane number, or any other environmental condition serves as a disturbance, and the disturbance change may make a learning value inappropriate. For this reason, in this step, it is judged whether the feedback correction amount in step S110, i.e., an ignition timing retard amount obtained through the knock control is apart from the learned ignition timing by the predetermined value or more. This judgment allows evaluation of whether the current learning value is appropriate. If it is judged in this step that the feedback correction amount is larger than the predetermined value, it can be determined that the current learning value is no longer appropriate and that an update process (to be described later) is necessary.

If it is not judged in step S112 that the feedback correction amount is larger than the predetermined value, the routine invoked this time ends without updating of the knock learning value. During a next combustion stroke, the routine in FIG. 5 is executed again.

If it is judged in step S112 that the feedback correction amount is larger than the predetermined value, the electronic control unit 16 executes a process of calculating timing when a fraction burned is 50% (step S114). The electronic control unit 16 then executes a process of calculating $\Delta V/V_{base2}$, i.e., a cylinder volume rate and updating the learning value with the calculated value (step S116). That is, in the series of processes, steps S114 and S116, the electronic control unit 16 executes the cylinder volume detection process, the first cylinder volume calculation process, the second cylinder volume calculation process, and the cylinder volume rate learning process of the "learning process" described earlier.

In step S114, the timing (a crank angle) when the fraction burned is 50% is calculated. In the step, an actual cylinder volume $V_{KCX}$ is first calculated. The actual cylinder volume $V_{KCX}$ is an actual cylinder volume for CA50 after the ignition timing feedback control in step S112. The actual cylinder volume $V_{KCX}$ is achieved by the electronic control unit 16 through executing the second cylinder volume calculation process of the "learning process" described above.

Note that although the ignition timing for achieving the actual cylinder volume $V_{KCX}$ is set in step S108, the judgment routine in step S112 shows that the ignition timing is inappropriate. The ignition timing determined by the ignition timing feedback control process in step S110 is considered as significantly different from ignition timing that achieves the actual cylinder volume $V_{KC2}$. The actual cylinder volume $V_{KCX}$ thus has a different value from the actual cylinder volume $V_{KC2}$.

A base cylinder volume is read out from the base cylinder volume map on the basis of the operational status this time. As described earlier, since the current operational status is assumed to be in the second operating state for convenience, $V_{base2}$ is read out from the base cylinder volume map. The process corresponds to the first cylinder volume calculation process in the "learning process" described earlier.

In step S116, the cylinder volume rate is calculated according to the expressions below using the actual cylinder volume $V_{KCX}$ and the base cylinder volume $V_{base2}$. This process corresponds to the cylinder volume rate learning process in the "learning process" described earlier.

$$\text{Cylinder Volume Rate}=\Delta V/V_{base2} \quad (7)$$

$$\Delta V=V_{base2}-V_{KCX} \quad (8)$$

The expressions correspond to Mathematical Expressions (2) and (3) described earlier. The electronic control unit 16 executes a learning value storage process of storing a value of $\Delta V/V_{base2}$ as a knock learning value in a predetermined memory area. With this execution, the knock learning value updating is completed.

After that, the routine invoked this time ends. During a next combustion stroke, the routine in FIG. 5 is executed again.

Note that a cylinder volume determined by a crank angle at which a fraction burned is 50% is utilized for knock learning in the first embodiment. Specific examples of the cylinder volume include the base cylinder volumes $V_{base1}$ and $V_{base2}$ and the actual cylinder volumes $V_{KC1}$ and $V_{KC2}$ shown in FIG. 3. In the first embodiment, the "crank angle at which the fraction burned is 50%," i.e., CA50 serves as a "representative crank angle for combustion." This is because checking the relative positional relationship of CA50 allows detection of whether a combustion period is on the advance side or on the retard side on the whole.

The present invention, however, is not limited to this, and a cylinder volume determined by a crank angle at which a fraction burned is other than 50% may be used. As for a fraction burned, for example, any percentage from 0 to 100% or, specifically, any one of fractions burned of 10%, 20%, 30%, . . . 60%, 70%, 80%, and the like may be used as a predetermined fraction burned instead of a fraction burned of 50%. Note that adoption of increments of 10% is illustrative only. Crank angles corresponding to the fractions burned are referred to as CA10, CA20, CA30, . . . , CA60, CA70, and CA80 according to the same rule as CA50. A cylinder volume determined by a crank angle with a selected desired fraction burned may be utilized as a learning parameter for knock learning according to the first embodiment. A crank angle with a predetermined fraction burned will be abbreviated as a "predetermined fraction burned crank angle."

Note that timing when a fraction burned is 50% serves as a center of gravity of combustion. CA50 is thus preferable in that CA50 can represent the whole combustion in a balanced manner, as compared with, e.g., CA10 or CA20 in a first half of combustion or CA70 or CA80 in a second half of combustion.

Note that in a second half of combustion, i.e., at timing later than when a fraction burned is 50%, the temperature and pressure of unburned gas are higher to contribute greatly to knock occurrence. For this reason, an emphasis may be placed on the second half of combustion. That is, for example, CA60 or CA70 may be selected as the predetermined fraction burned crank angle instead of CA50, and the ignition timing control device according to the first embodiment may be constructed.

Note that the cylinder volume for CA50 is obtained through estimation by the cylinder volume detection process in the first embodiment. The present invention, however, is not limited to this, and direct sensing using a cylinder pressure sensor may be performed. That is, a cylinder pressure sensor may be installed in the internal combustion engine 10, a fraction burned may be calculated according to Mathematical Expression (1) by direct sensing of the pressure in a cylinder. A crank angle with a fraction burned of 50% may be identified from the calculated fraction burned, and a cylinder volume may be calculated from the identified crank angle. As described above, a cylinder volume for CA50 may be obtained utilizing a result of sensing of a cylinder pressure from a cylinder pressure sensor.

Second Embodiment

Configuration of Device According to Second Embodiment

The hardware configuration of an ignition timing control device according to a second embodiment is the same as the device configuration according to the first embodiment (the configuration shown in FIG. 1). Illustration of the hardware configuration is thus omitted.

Action of Device According to Second Embodiment

Figure 6:
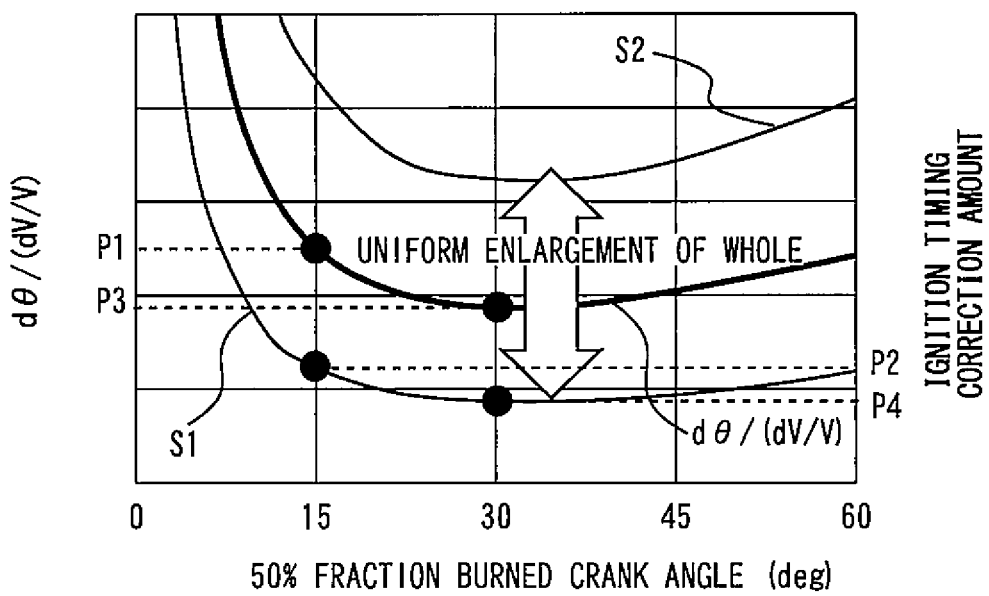
FIG. 6 is a schematic chart for explaining the details of knock learning in an ignition timing control device according to a second embodiment of the present invention.

FIG. 6 is a schematic chart for explaining the details of knock learning in the ignition timing control device according to the second embodiment of the present invention. A bold characteristic curve denoted by reference character $d\theta/(dV/V)$ in FIG. 6 is referred to as a "base characteristic curve." The base characteristic curve represents the amount of change in crank angle per unit cylinder volume change rate. A cylinder volume change rate $dV/V$ here is a value obtained by dividing an infinitesimal cylinder volume change $dV$ by a cylinder volume $V$. The base characteristic curve represents the amount $d\theta$ of change in crank angle required to change a cylinder volume such that the cylinder volume change rate $dV/V$ has a value of 1 for a plurality of operating states different in CA50. The base characteristic curve shows a theoretical value calculated from a crank diameter and a connecting rod length which are geometrical dimensions of an internal combustion engine 10.

Thin characteristic curves S1 and S2 in FIG. 6 each represent an ignition timing correction amount. The ignition timing correction amount is a retard amount with respect to base ignition timing.

The knock learning according to the second embodiment will be schematically described. The second embodiment is based on the assumption that the "amount of change in crank angle per volume change rate" and an "ignition timing correction amount" are proportional to each other. In the description below, the "amount of change in crank angle per volume change rate" may be denoted by $d\theta/(dV/V)$ for simplicity. FIG. 6 is a chart created on the basis of the assumption, and $d\theta/(dV/V)$ and the ignition timing correction amount are both plotted along the ordinate of the same graph with scale marks. In the present embodiment, calculation that "uniformly enlarges the whole to times corresponding to a learning coefficient" is performed on the base characteristic curve, as schematically indicated by an arrow in FIG. 6. As a result, the characteristic curves S1 and S2 are obtained, and the ignition timing correction amount is calculated utilizing the characteristic curves S1 and S2.

That is, the characteristic curve S1, which is obtained by enlarging, on the whole, the base characteristic curve to times corresponding to the learning coefficient, is obtained by multiplying the base characteristic curve by the learning coefficient. In the present embodiment, a value determined from the characteristic curve S1 is set as an ignition timing retard amount for each crank angle for CA50 in each operating state. It is thus possible to utilize an appropriate ignition timing learning value obtained through knock control for ignition timing control.

The ignition timing control device according to the second embodiment finally calculates the ignition timing correction amount using the base characteristic curve and the learning coefficient, by which the base characteristic curve is to be multiplied. An electronic control unit 16 stores a map defining the base characteristic curve and includes a storage area, to which the learning coefficient can be written and from which the learning coefficient can be read out.

The details of processing to be executed by the electronic control unit 16 in the second embodiment will be described below as two divided processes: a "coefficient learning process" and a "coefficient utilization process."

(Coefficient Learning Process)

Assume that a first combustion stroke is made in the internal combustion engine 10 in an operating state where CA50 is located at a crank angle of 15°. That is, as for the first combustion stroke, combustion is carried out with the given engine revolution speed $NE_{21}$, a given engine load $KL_{21}$, and given ignition timing $SA_{21}$, which results in CA50 located at the crank angle of 15°. In this case, a value of dθ/(dV/V) on the base characteristic curve is P1 (° CA). This means that ignition timing needs to be changed by dθ=P1 (° CA) to change the cylinder volume such that the cylinder volume change rate (dV/V) has a value of 1.

Like the first embodiment, in the second embodiment as well, the electronic control unit 16 performs knock control, i.e., performs ignition timing feedback control on the basis of an output from a knock sensor 15 such that a knock level is not more than an allowable level. Assume that the knock control is performed in the operating state where CA50 is located at the crank angle of 15° and that an ignition timing retard amount as a result of the knock control is P2 (° CA) when the result of the knock control (the ignition timing retard amount) is plotted on the map shown in FIG. 6.

In the second embodiment, the electronic control unit 16 executes a process of storing a value of P2/P1 as a learning coefficient. The above-described situation means that although the amount of change in crank angle of P1 (° CA) is theoretically required to change the cylinder volume such that the cylinder volume change rate is 1, the ignition timing retard amount obtained as a result of the actual knock control is P2 (° CA) less than P1 (° CA). Thus, the value of P2/P1 represents the cylinder volume change rate that has been changed by the last knock control.

A description will be given with specific numerical values which are different from values of the graph shown in FIG. 6 for ease of understanding. For example, assume that P1 on the base characteristic curve is 5° CA and P2, i.e., the retard amount obtained through the knock control is 2° CA. In this case, a cylinder volume change which causes the cylinder volume change rate to be 1 can be produced by changing a crank angle by 5° CA. If the crank angle is changed by 2° CA, the cylinder volume change rate has a value of ⅖, i.e., 0.4. The learning coefficient P2/P1 in this case is 0.4.

In other words, ignition timing is retarded to achieve a desired knock reduction effect in the knock control. The amount of the retard is a retard amount just enough to change (increase) the cylinder volume such that the cylinder volume change rate has a value of 0.4.

(Coefficient Utilization Process)

A method for utilizing the learning coefficient will be described. Assume that a second combustion stroke is made in the internal combustion engine 10 in an operating state where CA50 is located at a crank angle of 30° after the first combustion stroke. That is, as for the second combustion stroke, combustion is carried out with the given engine revolution speed $NE_{22}$, a given engine load $KL_{22}$, and given ignition timing $SA_{22}$, which results in CA50 located at the crank angle of 30°. In this case, a value on the base characteristic curve is P3 (° CA). This means that the ignition timing needs to be changed by P3 (° CA) to obtain the cylinder volume change rate (dV/V) of 1.

In the second embodiment, the learning coefficient P2/P1 is utilized. As described earlier, the learning coefficient P2/P1 represents the cylinder volume change rate when the cylinder volume is changed due to the retardation of the ignition timing through the last knock control. To obtain the same knock reduction effect as the knock control performed in the operating state last time (in the case of an operational condition with CA50 located at the crank angle of 15°) in the operating state this time (in the case of an operational condition with CA50 located at the crank angle of 30° as well, the ignition timing may be retarded just enough to cause an increase in cylinder volume at the same cylinder volume change rate. The increase in cylinder volume at the same cylinder volume change rate means to cause an increase in cylinder volume for CA50 such that the cylinder volume change rate has a value of 0.4.

It can be seen from the base characteristic curve that the value of dθ/(dV/V) is P3 (° CA) in the operating state where CA50 is located at the crank angle of 30°. This means that the ignition timing needs to be changed by P3 (° CA) to obtain the cylinder volume change rate (dV/V) of 1 in the operating state where CA50 is located at the crank angle of 30°.

A description will be given with specific numerical values which are different from the values of the graph shown in FIG. 6 for ease of understanding. For example, assume that P3 is 4° CA. In this case, the cylinder volume change rate can be brought to 1 by changing the crank angle by 4° CA in the operating state where CA50 is located at the crank angle of 30°.

The electronic control unit 16 multiplies the learning coefficient P2/P1 and a value of P3. The electronic control unit 16 calculates an appropriate ignition timing retard amount at the present moment in the operating state where CA50 is located at the crank angle of 30° on the basis of the cylinder volume change rate obtained through the calculation.

For example, in the coefficient learning process described earlier, a specific example of the finally obtained learning coefficient is P2/P1=0.4. If the ignition timing is similarly retarded in the operating state where CA50 is located at the crank angle of 30° so as to achieve a cylinder volume change rate that is 0.4 times a value of the base characteristic curve, the same knock reduction effect as the knock control implemented in the operating state where CA50 is located at the crank angle of 15°. That is, in the operating state where CA50 is located at the crank angle of 30°, the cylinder volume change rate can be brought to 1 by changing the crank angle by 4° CA. According to this rule, to make the cylinder volume change rate 0.4 times a value of the base characteristic curve, the ignition timing may be retarded by 4×0.4=1.6 (° CA).

If the calculation method is described using the reference characters shown in FIG. 6, P4 (° CA) is derived from the expression below:

$$P4=(P2/P1)\times P3 \quad (9)$$

The electronic control unit 16 sets a value of P4 (° CA) as an ignition timing retard amount. It is thus possible to perform knock learning in a different operating state and appropriately set ignition timing in an operating state this time utilizing a result of the learning.

Specific Control Process of Device According to Second Embodiment

Figure 7:
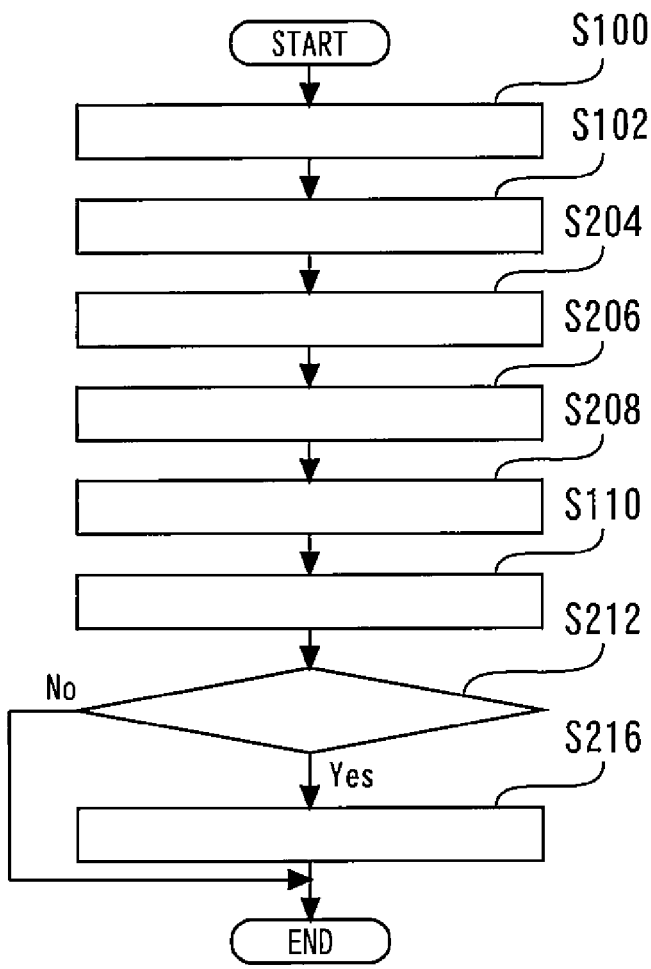
FIG. 7 is a flowchart of a routine to be executed by an electronic control unit in the ignition timing control device according to the second embodiment of the present invention.

FIG. 7 is a flowchart of a routine to be executed by the electronic control unit 16 in the ignition timing control device according to the second embodiment of the present invention. The electronic control unit 16 repeatedly executes the routine for each combustion stroke (each combustion cycle) during operation of the internal combustion engine 10. A case will be described below where the routine in FIG. 7 is executed again after the routine in FIG. 7 is executed once, and a learning coefficient is obtained once.

In the routine in FIG. 7, the electronic control unit 16 first executes processes in steps S100 and S102, like the specific processes according to the first embodiment shown in FIG. 5.

The electronic control unit 16 executes a process of calculating an ignition timing correction value (step S204). The process in step S204 is a process of calculating the ignition timing correction amount as a crank angle for a disturbance related to an intake temperature or the like, about which an individual determination can be made. Note that the relationship between the amount of each disturbance (e.g., the amount of change in intake temperature) and an ignition timing correction amount is stored in advance in the electronic control unit 16 in the form of a map or a calculation expression. With the execution of the process in step S204, the ignition timing correction amount (° CA) is calculated as a retard amount or an advance amount.

The electronic control unit 16 executes a process of calculating a KCS ignition timing learning amount (step S206).

In these steps, the electronic control unit 16 performs the "coefficient utilization process" described earlier.

In step S206, the electronic control unit 16 first executes a process of reading out a learning coefficient K learned through the "coefficient learning process" from a predetermined storage area of a memory. For convenience of illustration, the present embodiment assumes that the last knock learning is performed in "the operating state where CA50 is located at the crank angle of 15° (i.e., with the engine revolution speed $NE_{21}$, the given engine load $KL_{21}$, and the given ignition timing $SA_{21}$)" and that the value of P2/P1 is stored in the learning coefficient K. Note that a specific numerical value of the learning coefficient K given in the above description is 0.4.

The electronic control unit 16 executes a process for calculating an ignition timing retard amount necessary for knock reduction according to Mathematical Expression (9) described earlier using the learning coefficient K. In the present embodiment, the current operational status is assumed to be in the "operating state where CA50 is located at the crank angle of 30°" for convenience of illustration, i.e., with the engine revolution speed $NE_{22}$, the given engine load $KL_{22}$, and the given ignition timing $SA_{22}$.

By the calculation according to Mathematical Expression (9), the ignition timing retard amount P4 (° CA) is calculated to be (P2/P1)×P3. As a result, the ignition timing retard amount P4 can be calculated so as to obtain the same level of knock reduction effect as the knock control performed in the operating state at the time of the learning coefficient acquisition. Note that a specific numerical value given in the above description is 1.6 (° CA). In the second embodiment as well, the ignition timing retard amount and a CA50 retard amount are treated as coinciding with each other.

In the present embodiment, in step S204, a process of adding the ignition timing correction amount in step S206 and the ignition timing retard amount P4 obtained from the learning coefficient K is executed. With this process, a final ignition timing correction amount is calculated.

The electronic control unit 16 executes a process of reflecting the ignition timing correction amount calculated in step S206 in ignition timing (step S208). The electronic control unit 16 performs ignition timing control so as to retard the ignition timing with respect to the current ignition timing $SA_{22}$ by the ignition timing retard amount obtained by the above-described series of processes.

The electronic control unit 16 then executes an ignition timing feedback control process on the basis of an output from the knock sensor 15, like the first embodiment (step S110). Note that a combustion stroke has been started in the internal combustion engine 10 at the beginning of this step and that the internal combustion engine 10 is in a situation where knocking can be detected by the knock sensor 15. In this step, ignition timing control is performed, through execution of knock control by the electronic control unit 16, such that knocking is at or below an allowable level. An initial value for the knock control is ignition timing set in step S208 above (i.e. learned ignition timing).

The electronic control unit 16 then executes a process of judging whether a feedback correction amount is larger than a predetermined value (step S212). The details of the process are the same as step S212 in the first embodiment. It is judged whether the ignition timing feedback correction amount, i.e., an ignition timing retard amount obtained through the knock control is apart from the learned ignition timing by the predetermined value or more.

If it is not judged in step S212 that the feedback correction amount is larger than the predetermined value, the routine invoked this time ends without updating of the learning coefficient K. The routine in FIG. 7 is executed again during a next combustion stroke.

If it is judged in step S212 that the feedback correction amount is larger than the predetermined value, the electronic control unit 16 executes a process of calculating the learning coefficient K and updating the learning coefficient with a calculated value (step S216).

In step S216, the learning coefficient K is calculated according to the "coefficient learning process" described earlier. That is, an ignition timing retard amount P' obtained as a result of this knock control is divided by P3. A value of P'/P3 is the newly learned learning coefficient K. The electronic control unit 16 executes a storage process of storing P'/P3 in the predetermined memory area. With this process, updating of the learning coefficient K is completed.

After that, the routine invoked this time ends. The routine in FIG. 7 is executed again during a next combustion stroke.

REFERENCE SIGNS LIST 10 internal combustion engine
11 cylinder block
13 combustion chamber
14 spark plug
14a igniter
15 knock sensor
16 electronic control unit
17 crank angle sensor
19 throttle sensor
20 air flow meter

The invention claimed is:

1. An ignition timing control device for an internal combustion engine, comprising:
knock control means for performing ignition timing control such that knocking of the internal combustion engine is at or below a predetermined level;
first cylinder volume calculation means for calculating a cylinder volume at a predetermined fraction burned crank angle during a combustion stroke made with first base ignition timing when an engine operational status is in a first operating state;
second cylinder volume calculation means for calculating a cylinder volume at the predetermined fraction burned crank angle during a combustion stroke made with ignition timing obtained through the ignition timing control by the knock control means when the engine operational status is in the first operating state;

cylinder volume rate learning means for calculating a cylinder volume rate which is a value obtained by dividing, by the cylinder volume calculated by the first cylinder volume calculation means, a difference as a remainder after the cylinder volume calculated by the second cylinder volume calculation means is subtracted from the cylinder volume calculated by the first cylinder volume calculation means and storing the calculated cylinder volume rate as a learning value;

third cylinder volume calculation means for calculating a cylinder volume at the predetermined fraction burned crank angle during a combustion stroke made with second base ignition timing when the engine operational status is in a second operating state different from the first operating state; and setting means for setting learned ignition timing which is ignition timing as an initial value at the time of ignition timing control by the knock control means when the engine operational status is in the second operating state, the setting means setting the learned ignition timing such that a cylinder volume at the predetermined fraction burned crank angle during a combustion stroke made with the learned ignition timing increases with increase in the learning value.

2. The ignition timing control device for the internal combustion engine, according to claim 1, wherein the setting means sets the learned ignition timing such that the cylinder volume at the predetermined fraction burned crank angle during the combustion stroke made with the learned ignition timing changes from the cylinder volume calculated by the third cylinder volume calculation means by an integrated value which is obtained by integrating the learning value into the cylinder volume calculated by the third cylinder volume calculation means.

3. The ignition timing control device for the internal combustion engine, according to claim 1, wherein the predetermined fraction burned crank angle is one crank angle selected from a crank angle range where a fraction burned is not less than 50%.

4. The ignition timing control device for the internal combustion engine, according to claim 1, wherein the setting means includes means for calculating the cylinder volume at the predetermined fraction burned crank angle according to a rule that the crank angle with the predetermined fraction burned is retarded in proportion to a retard amount with respect to the learned ignition timing.

5. The ignition timing control device for the internal combustion engine, according to claim 1, further comprising base value storage means for storing information defining, for each of engine operational statuses, a base cylinder volume value which is a base value for a cylinder volume at the predetermined fraction burned crank angle, wherein the first cylinder volume calculation means includes means for reading out, as the cylinder volume at the predetermined fraction burned crank angle, a value corresponding to the first operating state among a plurality of base cylinder volume values stored in the base value storage means, and the third cylinder volume calculation means includes means for reading out, as the cylinder volume at the predetermined fraction burned crank angle, a value corresponding to the second operating state among the plurality of base cylinder volume values stored in the base value storage means.

6. An ignition timing control device for an internal combustion engine, comprising:

knock control means for performing ignition timing control such that knocking of the internal combustion engine is at or below a predetermined level;

storage means for storing a characteristic defining a relationship between the amount of change in crank angle per unit cylinder volume change rate and a crank angle;

first crank angle acquisition means for obtaining, through sensing or estimation, a predetermined fraction burned crank angle during a combustion stroke when an engine operational status is in a first operating state;

first characteristic value calculation means for calculating, as a first characteristic value, a value of the amount of change in crank angle per unit cylinder volume change rate at the predetermined fraction burned crank angle obtained by the first crank angle acquisition means according to the characteristic;

learning means for storing, as a learning coefficient, a ratio of a retard amount obtained through ignition timing control by the knock control means to the first characteristic value when the ignition timing control is performed in the first operating state;

a second crank angle acquisition means for obtaining, through sensing or estimation, the predetermined fraction burned crank angle during a combustion stroke when the engine operational status is in a second operating state different from the first operating state;

second characteristic value calculation means for calculating, as a second characteristic value, a value of the amount of change in crank angle per unit cylinder volume change rate at the predetermined fraction burned crank angle obtained by the second crank angle acquisition means according to the characteristic; and setting means for setting a learning retard amount which is an initial value for an ignition timing retard amount at the time of ignition timing control by the knock control means when the engine operational status is in the second operating state, the setting means setting the learning retard amount on the basis of a value obtained by multiplying the second characteristic value by the learning coefficient.

7. An internal combustion engine, comprising:

a cylinder;

a knock sensor provided with the cylinder;

a spark plug provided with the cylinder; and a control unit configured to receive a signal from the knock sensor control the spark plug, wherein the control unit having control logic configured to:

(i) perform knock control controlling an ignition timing such that knocking of the internal combustion engine is at or below a predetermined level;

(ii) perform first cylinder volume calculation for calculating a cylinder volume at a predetermined fraction burned crank angle during a combustion stroke made with first base ignition timing when an engine operational status is in a first operating state;

(iii) perform second cylinder volume calculation for calculating a cylinder volume at the predetermined fraction burned crank angle during a combustion stroke made with ignition timing obtained through the ignition timing control by the knock control when the engine operational status is in the first operating state;

(iv) perform cylinder volume rate learning for calculating a cylinder volume rate which is a value obtained by dividing, by the cylinder volume calculated by the first cylinder volume calculation, a difference as a remainder after the cylinder volume calculated by the second cylinder volume calculation is subtracted from the cylinder volume calculated by the first cylinder volume calculation and storing the calculated cylinder volume rate as a learning value;

(v) perform third cylinder volume calculation for calculating a cylinder volume at the predetermined fraction burned crank angle during a combustion stroke made with second base ignition timing when the engine operational status is in a second operating state different from the first operating state; and (vi) set learned ignition timing which is ignition timing as an initial value at the time of ignition timing control by the knock control when the engine operational status is in the second operating state, and set the learned ignition timing such that a cylinder volume at the predetermined fraction burned crank angle during a combustion stroke made with the learned ignition timing increases with increase in the learning value.

8. An internal combustion engine, comprising:
a cylinder;
a knock sensor provided with the cylinder;
a spark plug provided with the cylinder; and
a control unit configured to receive a signal from the knock sensor control the spark plug, wherein
the control unit storing a characteristic defining a relationship between the amount of change in crank angle per unit cylinder volume change rate and a crank angle, and having control logic configured to:

(i) perform knock control controlling an ignition timing such that knocking of the internal combustion engine is at or below a predetermined level;

(ii) perform first crank angle acquisition for obtaining, through sensing or estimation, a predetermined fraction burned crank angle during a combustion stroke when an engine operational status is in a first operating state;

(iii) perform first characteristic value calculation for calculating, as a first characteristic value, a value of the amount of change in crank angle per unit cylinder volume change rate at the predetermined fraction burned crank angle obtained by the first crank angle acquisition according to the characteristic;

(iv) perform learning for storing, as a learning coefficient, a ratio of a retard amount obtained through ignition timing control by the knock control to the first characteristic value when the ignition timing control is performed in the first operating state;

(v) perform a second crank angle acquisition for obtaining, through sensing or estimation, the predetermined fraction burned crank angle during a combustion stroke when the engine operational status is in a second operating state different from the first operating state;

(vi) second characteristic value calculation for calculating, as a second characteristic value, a value of the amount of change in crank angle per unit cylinder volume change rate at the predetermined fraction burned crank angle obtained by the second crank angle acquisition according to the characteristic; and (vii) set a learning retard amount which is an initial value for an ignition timing retard amount at the time of ignition timing control by the knock control when the engine operational status is in the second operating state, and set the learning retard amount on the basis of a value obtained by multiplying the second characteristic value by the learning coefficient.

* * * * *